Figure 3:
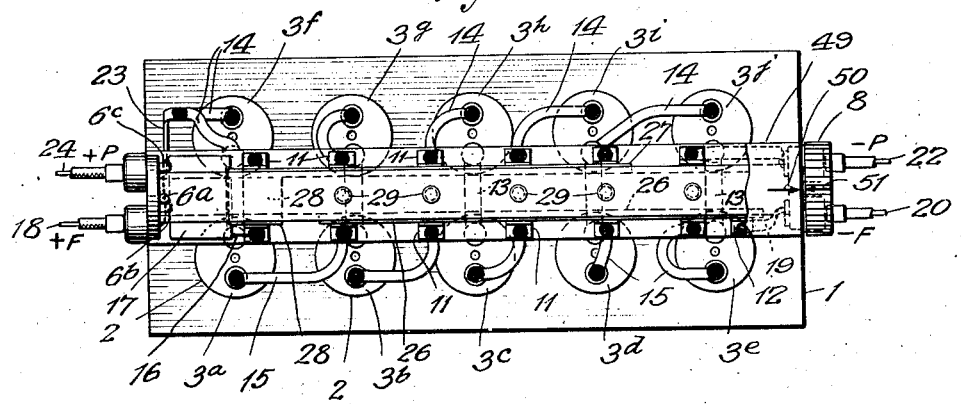

Dec. 9, 1924.
T. S. COLE
1,518,564
RADIO TELEPHONE AND TELEGRAPH APPARATUS
Filed Oct. 27, 1922    2 Sheets-Sheet 1
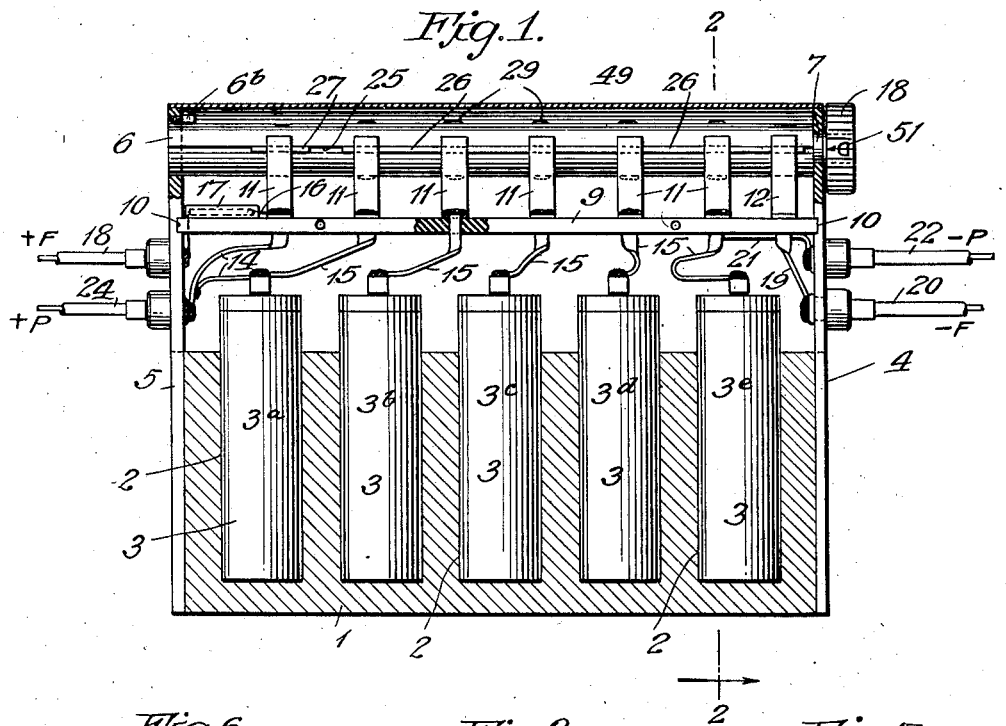
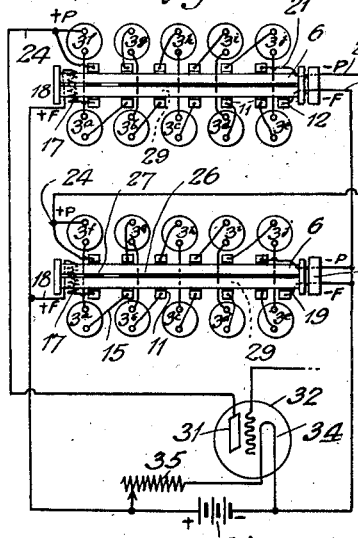
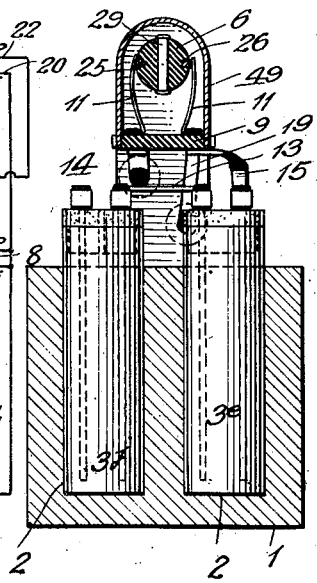
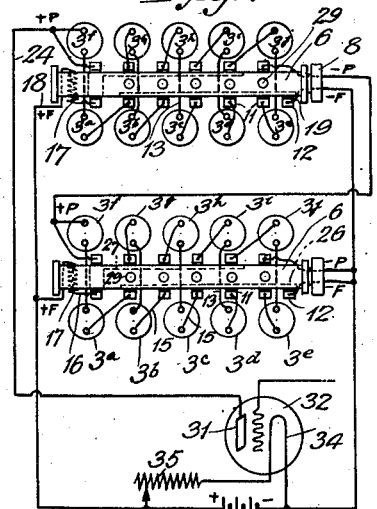
INVENTOR.
THEODORE S. COLE
BY *Stockbridge & Borst*
ATTORNEYS.

INVENTOR.
THEODORE S. COLE
ATTORNEYS.

Patented Dec. 9, 1924.

1,518,564

UNITED STATES PATENT OFFICE.

THEODORE S. COLE, OF NEW HAVEN, CONNECTICUT.

RADIO TELEPHONE AND TELEGRAPH APPARATUS.

Application filed October 27, 1922. Serial No. 597,335.

*To all whom it may concern:*

Be it known that I, THEODORE S. COLE, a citizen of the United States, residing at New Haven, in the county of New Haven and State of Connecticut, have invented certain new and useful Improvements in Radio Telephone and Telegraph Apparatus, of which the following is a full, clear, and exact description.

This invention relates to vacuum tube systems and particularly to storage battery devices used in connection therewith. Heretofore batteries of dry cells have been commonly employed for supplying the electrical energy to the plate circuits of vacuum tubes, but they have been unsatisfactory for various reasons such as their short life, and because poor electrolytic contact in a single cell will cause the battery to be noisy and therefore objectionable in vacuum tube circuits, particularly in radio telephone apparatus. Attempts have been made to utilize storage batteries in the plate circuits, but such attempts have been unsuccessful for various reasons, one of the reasons being that an ordinary storage battery having the necessary potential is relatively large and expensive, and when large enough to avoid the necessity of frequent charging there is danger that because of the extremely low current rate of discharge in the plate circuit, the battery may be unintentionally discharged, to exhaustion, which is highly injurious thereto. Another reason is that the charging of a relatively large number of storage cells in series aggravates differences in capacities that are always present in such series of cells. It has been found that a storage battery with cells sufficiently small that the current corresponds to the normal ten hour rate of discharge provides the most satisfactory performance for storage batteries, but this arrangement necessitates the frequent charging of the batteries which is often inconvenient, especially in connection with vacuum tube sets such as are employed in radio telephone and telegraph apparatus.

An object of this invention is to provide an improved vacuum tube system and storage battery devices therefor in which may be incorporated as many as possible of the advantages of present dry and storage batteries and as few as possible of the disadvantages thereof; which will be free from noise in the plate circuit; which utilizes a battery with a low ampere hour capacity so as to reduce the likelihood of overdischarge; and which is efficient, compact, convenient, and relatively inexensive. A further object is to provide an improved storage B battery device for vacuum tubes in which the B battery cells thereof can be recharged at intervals from the A or filament battery in a simple, convenient, safe and effective manner, which is compact, simple and inexpensive in construction, and which utilizes but little energy from the A battery. Other objects and advantages will be apparent from the following description of an embodiment of the invention and the novel features will be hereinafter particularly pointed out in claims.

Figure 4:
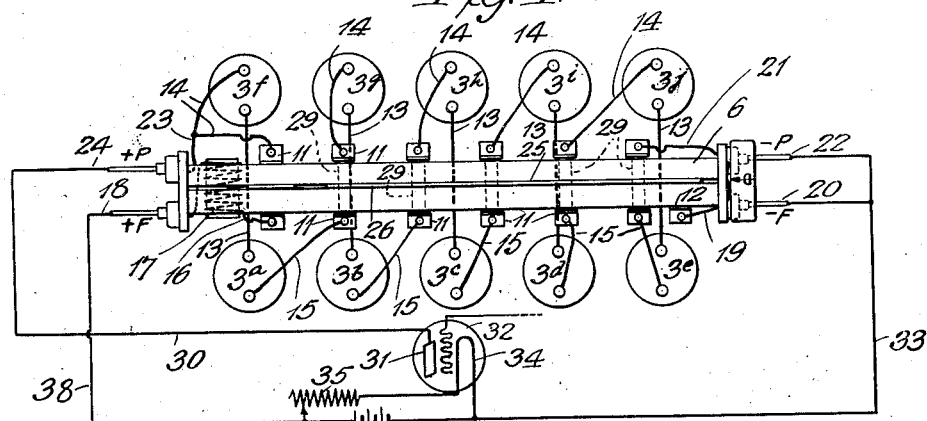
Figure 5:
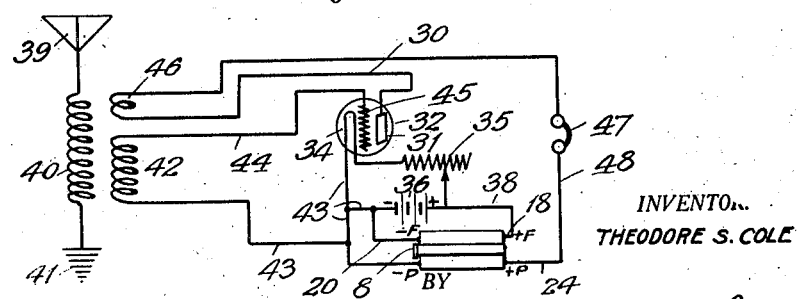

In the accompanying drawing:

Fig. 1 is a longitudinal sectional elevation through a B battery and switching device constructed in accordance with this invention, Fig. 2 is a transverse sectional elevation through the same, taken substantially along the line 2—2 of Fig. 1, Fig. 3 is a plan of the same with a portion of the switch enclosing casing broken away to show the interior thereof, Fig. 4 is a diagram showing the connections between the switch device and the cells of the B battery, and their relationship to a vacuum tube, Fig. 5 is a wiring diagram of a vacuum tube with this arrangement of batteries and switching device, as employed in radio telephony, Fig. 6 is a diagram similar to Fig. 4 but showing the connections when two of the storage battery devices or units are connected together, with the switching devices in position to allow the B battery to discharge, and Fig. 7 is a similar view with the switching devices in position to permit charging of the B battery from the A battery.

In the illustrated embodiment of the invention a block 1 of suitable material is provided in its upper face with a plurality of recesses 2, in each of which a storage battery cell 3 is disposed with its upper end projecting slightly from the upper face of the block. A colloidal acid silicate jelly may be used as the electrolyte to avoid accidental spilling. Uprights 4 and 5 are secured to opposite ends of the block and extend above the same, and rotatably support a rotor or shaft 6 of insulating material such as hard rubber, which extends through and between the same in spaced relation to the upper face of the block and above the upper ends of the cells. The rotor or shaft 6 is provided at the end which passes through one of the uprights, such as 4, with a reduced extension 7, which forms the bearing in the upright 4, and an operating button 8 is secured upon the outer end of the reduced extension and serves as operating means by which the shaft may be rotated. The button 8 by abutting against the outer face of the upright 4, prevents withdrawal of the rotor or shaft 6 from the upright 4 and the shoulder of shaft 6 at the beginning of the reduced extension by abutting against the inner face of the upright 4 also cooperates to prevent longitudinal displacement of the shaft in the uprights.

A plate 9 of insulating material such as hard rubber extends between the uprights 4 and 5, and is received within grooves 10 in the inner faces of the uprights so as to be supported thereby in spaced relation above the upper ends of the cells. A plurality of spring brushes 11 are supported upon the plate 9 in pairs which extend upwardly at opposite sides of the rotor or shaft 6 and press thereon. An additional spring brush 12 is also supported upon the plate 9 at one end thereof, and bears upon the rotor or shaft 6 at one side thereof. For convenience in explaining the connections of the cells, the cells 3 will be designated as $3^a$, $3^b$, $3^c$, $3^j$, it being understood of course, that any number of cells may be employed. With five pairs of cells as illustrated, there will be six pairs of brushes 11 and the additional brush 12.

An electrode of each cell is directly connected by a wire 13 to the electrode of opposite polarity of the other cell of the pair, which cell is disposed for convenience at the opposite side of the shaft 6. The remaining electrodes of the cells $3^f$, $3^g$, $3^h$, $3^i$ and $3^j$ are connected by wires 14 individually to the brushes 11 at the corresponding side of the shaft 6 and arranged successively from one end, and the remaining electrodes of the cells $3^a$, $3^b$, $3^c$, $3^d$ and $3^e$ are connected by wires 15 individually to the brushes 11 upon the corresponding side of the shaft 6 and arranged successively from the opposite end of the shaft 6.

The end brush 11 adjacent the cell $3^a$ is connected by a wire 16 to a resistance unit 17 and the other end of the resistance unit is connected to a terminal wire 18 which may be referred to as a positive filament wire, and also be designated $+F$. The single brush 12 is connected by a wire 19 to a terminal wire 20 which may be referred to as the negative filament wire and will be also designated $-F$. The end brush 11 adjoining the cell $3^j$ is connected by wire 21 to a terminal wire 22 which may be referred to as a negative plate terminal wire and also designated upon the drawing $-P$. A wire 23 connects the wire 14 which extends between the cell $3^f$ and the adjoining end brush 11 to the terminal wire 24 which may be referred to as a positive plate terminal wire and also designated upon the drawing as $+P$.

The rotor or shaft 6 is provided upon diametrically opposite sides with longitudinally extending grooves 25 in which bus bars 26 and 27 are secured in any suitable manner. The bus bars project slightly outwardly beyond the peripheral surface of the shaft and have electrical contact with the brushes whenever the shaft 6 is rotated into a selected position. The bus bar 26 extends a length such that it engages with the single brush 12 at one end and does not engage with the brush 11 on the same side at the opposite end of the shaft. However, it does engage with all the brushes 11 between the end brush 11 and the single brush 12 on the same side of the shaft therewith. The bar 27 extends from the end brush 11 adjacent the cell $3^f$ toward the opposite end, but does not extend to or engage with the end brush 11 adjacent the cell $3^j$. The bar 27 has an extension 28 which passes through the shaft 6 so as to project also from the opposite side thereof and engage with the end brush 11 adjacent the cell $3^a$.

When the bus bars are in engagement with the brushes, the extension of the bus bar 27 will directly couple the end brushes 11 which are adjacent the cells $3^a$ and $3^f$. Conducting pins 29 are carried by the shaft 6 so as to extend diametrically through the same in alignment with the pairs of brushes adjacent the cells $3^b$ and $3^g$, $3^c$ and $3^h$, $3^d$ and $3^i$, and $3^e$ and $3^j$. These pins are disposed at right angles to the plane of the bus bars and serve to connect the brushes 11 opposite them when the shaft 6 is rotated to carry the bus bars out of engagement with the brushes. When the shaft 6 is rotated to carry the bus bars into engagement with the brushes, the pins 29 will be carried out of engagement with the brushes 11.

A pin $6^a$ carried by the shaft 6 may engage with pins $6^b$ and $6^c$ that are arranged in spaced relation on the upright 5 and limit rotation of the shaft 6 to approximately a quarter turn, the limits of which turn are the two positions in which the pins 29 or the bus bars connect the brushes.

The terminal wire 24 is connected by a wire 30 to the plate 31 of the vacuum tube 32, and the terminal wire 22 is connected by a wire 33 to one side of the filament 34 of the vacuum tube. The other side of the filament is connected through an adjustable rheostat 35 to one side of the A or filament battery 36. The wire 33 is also connected by wire 37 to the other side of the A battery 36. The terminal wire 18 is connected by a wire 38 to the positive side of the A battery 36 and the terminal wire 20 is connected to the wire 33.

With the shaft 6 in the angular position shown in Figures 4 and 6, which is the discharging position for the B battery, the circuits may be traced as follows: from the terminal wire 24 the current passes through wire 30 to the plate 31 of the vacuum tube and thence to the filament 34 and through wire 33 to the terminal wire 22. From the terminal wire 22 the current passes through wire 21 to an end brush 11; thence through a pin 29 in contact therewith to the opposite brush 11; thence by a wire 15 to one electrode of the cell $3^e$; thence from the other electrode of this cell, through a wire 13 to one electrode of the cell $3^j$. From the opposite electrode of cell $3^j$ the current passes by a wire 14 to another brush 11; thence through a pin 29 to the opposite brush 11; thence by a wire 15 to one electrode of the cell $3^d$. From the opposite electrode of the cell $3^d$, the current passes through a wire 13 to one of the electrodes of the cell $3^i$. From the other electrode of the cell $3^i$, the current passes through wire 14 to a brush 11 and through a pin 29 to the opposite brush 11; thence by wire 15 to one of the electrodes of the cell $3^c$. From the other electrode of the cell $3^c$ the current passes through a wire 13 to one of the electrodes of the cell $3^h$. From the other electrode of cell $3^h$ the current passes through a wire 14 to a brush 11, through a pin 29 to the opposite brush 11, and then through a wire 15 to one of the electrodes of the cell $3^b$. From the other electrode of the cell $3^b$ the current passes through a wire 13 to one of the electrodes of the cell $3^g$. From the other electrode of the cell $3^g$, the current passes through a wire 14 to one of the brushes 11, through pin 29 in contact therewith to the opposite brush 11, and then through a wire 15 to one of the electrodes of the cell $3^a$. From the other electrode of the cell $3^a$ the current passes through a wire 13 to one of the electrodes of the cell $3^f$. From the other electrode of the cell $3^f$ the current passes through wires 14 and 23 to the terminal wire 24.

It will thus be seen that all of the cells of the B battery are connected in series to one another, which is their relatively high voltage relation, and to the two electrodes of the vacuum tube. The A battery 36 supplies current through the rheostat to the filament 34 for heating the same in a manner well known in the art. In this position of the rotor or shaft 6, the brush 12, and the brush 11 to which the wire 16 is connected, will not be in contact with any of the bus bars or pins 29 so that the wires 18 and 20 from the A battery 36 will not be connected to the cells of the B battery.

When the switch shaft 6 is rotated through a quarter turn into the position shown in Figures 1, 2, 3 and 7, the pins 29 will be carried out of engagement with the brushes 11 and the bus bars will be carried into engagement with the brushes. In this position of the switch shaft 6, which is the charging position, the circuits may be traced as follows: from the positive side of the A battery 36 through the wire 38 to the terminal wire 18 of the switch device; thence through the fixed resistance 17 and wire 16 to an end brush 11; thence through the extension 28 to the bus bar 27. From the bus bar 27 the current passes through the end brush 11 adjacent the cell $3^f$ and through wire 14 to one electrode of the cell $3^f$. From the other electrode of the cell $3^f$ the current passes through a wire 13 to one of the electrodes of the cell $3^a$. From the other electrode of the cell $3^a$ the current passes through a wire 15 to a brush 11 adjoining the cell $3^b$, which brush 11 is the second from the end and bears upon the bus bar 26. The current passes through the bus bar 26 to the brush 12, which is also in electrical contact with the bus bar 26, thence through wire 19 to terminal wire 20, and thence through wires 33 and 37 to the negative side of the A battery 36.

At the same time the current will also pass from the bus bar 27 to a brush 11 next to an end brush and adjoining the cell 39, and from this brush through the wire 14 to one of the electrodes of the cell $3^g$. From the other electrode of the cell $3^g$ the current passes through a wire 13 to one of the electrodes of the cell $3^b$. From the other electrode of the cell $3^b$ the current passes through a wire 15 to another brush 11 which has electrical contact with the bus bar 26 and thus the current passes through the bus bar 26, brush 12, and wire 19 to terminal wire 20. In a similar manner, cells $3^c$ and $3^h$, $3^d$ and $3^i$, and $3^e$ and $3^j$, are connected in series in pairs, respectively, and the pairs in parallel to the opposite bus bars 26 and 27. It will thus be observed that the cells of the B battery are connected in series parallel relation to one another, which may be called a low voltage relation, and to the A battery through the fixed resistence. The voltage of the A battery, which is usually about 6 volts, will thus be impressed upon each pair of the cells of the B battery, the combined normal series voltage of each pair of cells of the B battery being approximately 4 to $4\frac{8}{10}$ volts when fully charged. The A battery will therefore charge all of the cells of the B battery through the fixed resistance in a manner well known.

The bus bar 27 does not extend far enough to engage with the end brush 11 connected to the wire 21, so that the plate circuit will be broken at this end brush 11 whenever the switch shaft 6 is in charging position with the bus bars in electrical contact with the other brushes.

The wires 14 and 15 which connect the electrodes of the cells of the B battery to the brushes are curved or looped so as to extend in a somewhat indirect manner between the connected points and thus provide lengths of these wires sufficient to limit by evaporation, the normal acid creepage from the cells along the conductors or wires before it can reach and corrode the brushes. The wires 14 and 15, as well as wires 13 are preferably made of lead or lead alloy, so as to be free from corrosion. The casings of the cells of the B battery are preferably of glass or other transparent material, so that the user can readily determine when the cells require replenishing with water, and the glass or transparent material, which is non-hydroscopic, prevents intercell leakage.

The vacuum tubes are commonly utilized in connection with radio telephone and telegraph apparatus, and it is in connection with such apparatus that a vacuum tube system constructed in accordance with this invention has probably its greatest utility. The application of this system to a simple radio telephone receiving set is shown diagramatically in Figure 5. In this diagram an antenna 39 is connected through a primary 40 to the ground 41. A secondary 42 is connected by wires 43 and 44 to the filament 34 and grid 45, respectively, of the vacuum tube 32. The plate 31 is connected by a wire 30 through a tickler 46 to one terminal of the telephone receiver 47. A wire 48 connects the other terminal of the receiver 47 to the positive plate terminal 24 of the switch device. The negative plate terminal 22 is connected to the wire 43. The positive filament terminal 18 of the switching device is connected by the wire 38 to the positive side of the A battery 36, and the negative filament terminal 20 is connected to the wire 43. The wire 43 is also connected to the negative side of the A battery 36. The A battery supplies current to the filament 34 through the rheostat 35.

When the receiving set is to be operated the button 8 of the switch shaft is manipulated to rotate the shaft 6 into the discharging position shown in Figures 4 and 6. In this position of the switching device the connection between the A or filament battery and the B battery will be broken at two points and the cells of the B battery will be connected in series to one another, and to the plate or working circuit of the vaccum tube so as to supply energy thereto. When the set is not in use the button 8 may be manipulated to shift the switching shaft 6 into the position shown in Figures 1, 2, 3 and 7 so as to interrupt the series connection between the cells of the B battery and connect them in series parallel to the filament battery 36 to be charged thereby. At the same time the plate circuit is interrupted at the end brush 11 which is connected to the wire 21. The A or filament battery will, therefore, charge the cells of the B battery while the apparatus is not in use. Since the difference of voltage between the charging and the charged cells is about two volts or less (usually less than one volt) when the cells are fully charged, there will be little or no danger of damage to or overcharging of the B battery from the A battery, with the fixed resistence in series therewith, if the B battery should be left in charging relation to the A battery for relatively long periods of time, such as might occur if one forgot or neglected to interrupt the charging at the proper time. This device may therefore be safely used by relatively unskilled persons. The rotor or shaft 6 may also be placed midway of the limits of its rotation so as to entirely break both plate and A battery connections thereto.

A casing 49 is secured over and between the uprights 4 and 5 and between the opposite side edges of the plate 9 so as to enclose the shaft 6 and the brushes. A reference mark 50 may be provided upon the end of the casing adjoining the button 8, and the button 8 may have suitable reference indicia 51 thereon which cooperates with the reference mark for indicating whether the shaft 6 is in position to connect the cells for charging or discharging.

It is frequently desirable to have a higher voltage in the plate circuit than that commonly employed, and, therefore, in Figures 6 and 7 I have illustrated the connections which may be employed when two of the improved storage battery devices are connected to a vacuum tube. In this arrangement the positive plate terminal 24 of one of the switching devices will be connected to the plate 31 of the vacuum tube and the negative plate terminal 22 of that device will be connected to the positive plate terminal 24 of the other switching device. The negative plate terminal 22 of said other switching device will be connected to both of the negative filament terminals 20 of both devices and in common to the negative side of the filament or A battery 36. The positive filament terminals 18 of both switching devices will be connected in parallel to one another and to the positive side of the filament battery. By manipulating the buttons 8 of the switching devices the cells of the B batteries may be connected in either charging or discharging relation, dependent upon whether the cells thereof are to be charged or are to be used for supplying energy to the plate or working circuit.

In the use of the switching device it may be assembled and connected in the manner illustrated, and by operating the switch device the cells of the B battery will be connected either in series parallel or in series relation to one another and the unused circuits will be broken. The energy used in the plate or B battery circuit of the vacuum tube, when receiving, is only about 3% to 7% of that used in the filament or A battery circuit, and therefore, it is both economical and convenient to store all of the energy in one large battery, which may be the filament or A battery, and then subsequently transfer portions of this energy to the B battery as needed. In this manner the B battery cells may be made small enough to be used at their normal discharge rate, and therefore, give the most satisfactory service and have the longest life. The electrolyte of the storage cells, makes good contact with the plates and consequently there is no interruption or partial interruption of the plate circuit with its attendant noise in the receiver. The cells may be charged frequently from the A battery, and with the arrangement disclosed may be left in charging relation to the A battery for long intervals of time without danger of overcharging or injury. Because of the fact that but two cells are in series in charging, the difference in capacities of the cells will not be particularly troublesome.

It will be obvious that various changes in the details and arrangements of parts and circuits herein described and illustrated for the purpose of explaining the nature of the invention may be made by those skilled in the art within the principle and scope of the invention as expressed in the appended claims.

I claim:

1. In a vacuum tube rectifying or amplifying system, a vacuum tube having a filament and a plate, a storage battery connected to the filament to heat the same, a plate circuit, a storage battery in said plate circuit for supplying energy thereto, a switch device, and connections from the switch device to both batteries whereby the cells of the plate circuit battery can be connected alternately either in a high voltage relation with one another in the plate circuit to furnish energy thereto or in a low voltage charging relation to the filament battery to be charged therefrom.

2. In a vacuum tube rectifying or amplifying system, a vacuum tube having a filament and a plate, a storage battery connected to the filament to heat the same, a plate circuit, a storage battery in said plate circuit for supplying energy thereto, a switch device, connections from the switch device to both batteries whereby the cells of the plate circuit battery can be connected alternately either in a high voltage relation with one another in the plate circuit to furnish energy thereto or in a low voltage charging relation to the filament battery to be charged therefrom, and a resistance included in the circuit between the batteries when placed in charging relation to one another by said switch device.

3. In a vacuum tube rectifying or amplifying system, a vacuum tube having a filament and a plate, a storage battery connected to the filament to heat the same, a plate circuit, a storage battery in said plate circuit for supplying energy thereto, a switch device, having a circuit changing member, means including connections from said device to both batteries whereby operation of the member to one position will connect the cells of the plate circuit battery in a high voltage relation with one another and to the plate circuit to furnish energy therefor, and operation to another position will interrupt the plate circuit and connect the cells of the plate circuit battery in a relatively low voltage relation to the filament battery to be charged therefrom.

4. In a vacuum tube rectifying or amplifying system, a vacuum tube having two electrodes, a storage battery connected to one of the electrodes to heat the same, a working circuit connected to said electrodes, a storage battery in said circuit for supplying energy thereto, a switch device comprising a controlling member and brushes arranged along and bearing thereon, connections between the cells of the second battery, between the cells and the brushes, and between the two batteries and the brushes, and conducting means carried by the controlling member whereby when the controlling member is in one relative position with respect to the brushes the connections between the batteries will be broken and the cells of the second battery will be connected in a high voltage relation with one another and to the working circuit, and when the controlling member is in another relative position, the connection of the second battery to the working circuit will be broken, and the cells of the second battery connected in a low voltage relation with one another and in charging relation to the first battery.

5. Radio telephone and telegraph apparatus comprising a telephone receiver, a vacuum tube having a filament and plate, a storage battery connected to the filament for heating the same, a second storage battery, a circuit including the plate, filament, telephone receiver and second battery, a switching device, and connections between the switching device and both batteries whereby when the device is in one position, the plate circuit will be broken and the second battery connected to the filament battery to be charged therefrom, and when in another position the plate circuit will be completed through the second battery and the charging connections broken.

6. Radio telephone and telegraph apparatus comprising a telephone receiver, a vacuum tube having a filament and plate, a storage battery connected to the filament for heating the same, a second storage battery, a circuit including the plate, filament, telephone receiver and second battery, a switching device connected to the cells of the second battery for connecting them together in either a relatively low voltage or high voltage relation to one another and means including connections between the switching device and the plate circuit and the filament battery whereby when the switching device connects the cells of the second battery in low voltage relation the plate circuit will be opened and the connections completed from the cells to the filament battery, and when the device connects the cells in high voltage relation the plate circuit will be completed through the second battery and the connections from the latter to the filament battery broken.

7. Radio telephone and telegraph apparatus comprising a telephone receiver, a vacuum tube having a filament and plate, a storage battery connected to the filament for heating the same, a second storage battery, a circuit including the plate, filament, telephone receiver and second battery, a switching device, connections between the switching device and both batteries whereby when the device is in one position, the plate circuit will be broken and the second battery connected to the filament battery to be charged therefrom, and when in another position the plate circuit will be completed through the second battery and the charging connections broken, and a fixed resistance included in the connection between the two batteries.

8. Radio telephone and telegraph apparatus comprising a telephone receiver, a vacuum tube having a filament and plate, a storage battery connected to the filament for heating the same, a second storage battery, a circuit including the plate, filament, telephone receiver and second battery, a switching device connected to the cells of the second battery for connecting them together in either a relatively low voltage or high voltage relation to one another, means including connections between the switching device and the plate circuit and the filament battery whereby when the switching device connects the cells of the second battery in low voltage relation the plate circuit will be opened and the connections completed from the cells to the filament battery, and when the device connects the cells in high voltage relation the plate circuit will be completed through the second battery and the connections from the latter to the filament battery broken, and a fixed resistance included in the connection between the two batteries.

In witness whereof, I hereunto subscribe my signature.

THEODORE S. COLE.